United States Patent [19]

Adell et al.

[11] 4,244,248

[45] Jan. 13, 1981

[54] METHOD AND APPARATUS FOR SETTING UP TOOLS, WORK PIECES AND SIMILAR ON A ROTATABLE SPINDLE

[75] Inventors: Lars Adell, Mjölby; Kent Mansson, Linköping, both of Sweden

[73] Assignee: Forenade Fabriksverken, Eskilstuna, Sweden

[21] Appl. No.: 971,448

[22] Filed: Dec. 20, 1978

[30] Foreign Application Priority Data

Feb. 24, 1978 [SE] Sweden ............................. 7802166

[51] Int. Cl.³ .............................................. B23B 31/40
[52] U.S. Cl. ...................................... 82/44; 279/2 A; 407/31; 409/234
[58] Field of Search .................... 82/44, 40 R, 1 C; 279/2 A; 407/31; 409/232, 234

[56] References Cited

U.S. PATENT DOCUMENTS

| | | | |
|---|---|---|---|
| 436,223 | 9/1890 | Evely | 82/44 |
| 1,465,240 | 8/1923 | Schurr | 407/31 |
| 3,242,818 | 3/1966 | Kastler | 409/234 |

FOREIGN PATENT DOCUMENTS 743530 12/1943 Fed. Rep. of Germany .......... 279/2 A

*Primary Examiner*—Leonidas Vlachos
*Attorney, Agent, or Firm*—Larson, Taylor and Hinds

[57] ABSTRACT

The invention relates to a method and an apparatus for setting up tools, work pieces and similar (11, 12, 19) on a rotatable spindle (10) by means of a clamp bushing comprising a double walled sleeve (2, 3) which is closed at both ends and which has at one end a fixed radially outwards directed collar (5) and at the opposite end means (6–9) for axially securing the tools or similar (11, 12, 19) on the clamp bushing, and in which the bushing is formed with means (16, 17) for providing a pressure in a recess (4) formed between the outer wall (2) and the inner wall (3) of the bushing and for releasing the pressure from said recess. One or more tools or similar having center bores fitting the outer dimension of the bushing are slipped onto the bushing, whereupon the axial locking means (6–9) are mounted at the outer end thereof in order to secure the tools in the axial direction on the bushing sleeve, and the bushing sleeve together with the tools or similar are slipped onto a rotatable spindle (10), and a pressure medium inside the recess (4) of the bushing sleeve is pressurized, whereby the two walls (2, 3) of the sleeve are subjected to a radially inwards and outwards directed pressure providing some expansion outwards and inwards respectively of the said walls, whereby the sleeve (2, 3), the rotatable spindle (10) and the tool or tools (11, 12, 19) are interconnected as a coherent unit which can easily be handled.

10 Claims, 5 Drawing Figures

METHOD AND APPARATUS FOR SETTING UP TOOLS, WORK PIECES AND SIMILAR ON A ROTATABLE SPINDLE

The present invention relates to a method and an apparatus for setting up tools, work pieces and similar on a spindle, preferably a rotatable spindle. The invention is useful both for fixed mounting and rotatable mounting of the tools, the work pieces etc., but for the sake of simplicity the invention will be disclosed in the following in connection to setting up of a rotatable tool.

For many types of rotatable tools it is wanted to have a very exact precision of the mounting or setting up and the following rotation of the rotating tools without any warpings or vibrations caused by non-exact centering of the tools. This is especially wanted in case of high speed rotating tools as for instance milling tools in wood working machines etc.

It has previously been suggested that the tools be mounted by means of connection bushings which are hydraulically rotatable so as to expand radially inwards and outwards. The said bushings, however, have certain limitations. A previously known type of bushing is fixed connected to the milling tool, generally by means of a shrunk-on hoop, but this work involves both mounting problems and dismounting problems, especially when the tool is to be exchanged, to be ground etc. Another problem in previously known bushings is that they cannot be used or can only be used with great difficulties for axially long milling tools or for mounting of several working tools axially on line with each other on the same spindle.

The basis of the invention therefore is the problem to provide a method and an apparatus for setting up tools, work pieces and similar on a spindle, preferably a rotatable spindle, whereby the tools can be mounted with great precision both in axial and in radial direction, in which it is possible to set up even long tools or several tools axially on line with each other on the same bushing and the same rotatable spindle, and in which the bushing together with the mounted tools can easily be released from the spindle, and in which the tools easily can be released from the bushing and the spindle if wanted.

The apparatus according to the invention comprises a clamp bushing in the form of a double walled sleeve which is closed at both ends and which has at least one inner very thin recess and a fixed collar at one end, against which the tools are adapted to be moved and clamped, and at the opposite end the sleeve is formed with means for axially clamping the tools against the said fixed collar. At some place, preferably at the fixed collar the sleeve is formed with means for introducing a pressure medium like oil, fat or similar into the thin recess between the two walls of the sleeve, and it is also formed with means for releasing the pressure from the sleeve recess.

The method according to the invention is substantially characterized in that one or more tools or similar formed with a suitable fit in relation to the outer dimension of the sleeve are mounted on the sleeve, a securing means is mounted at the outer end of the sleeve and is tightened so that the tool or the tools are pressed to the fixed collar of the sleeve, whereupon the sleeve together with the tools mounted thereon is mounted on a rotatable spindle, a pressure medium is pressed into the recess between the two walls of the sleeve, whereby the said walls are subjected to a radially outwards and radially inwards directed pressure, whereby the sleeve, the rotatable spindle and the tool or the tools are interconnected to an integral unit which can easily be dismounted.

Further characteristics and advantages of the invention will be evident from the following detailed specification in which reference will be made to the accompanying drawings.

In the drawings

FIG. 1 is a perspective view of a clamp bushing according to the invention, and

FIG. 2 correspondingly shows a clamp bushing according to the invention in another perspective view.

Figure 1:
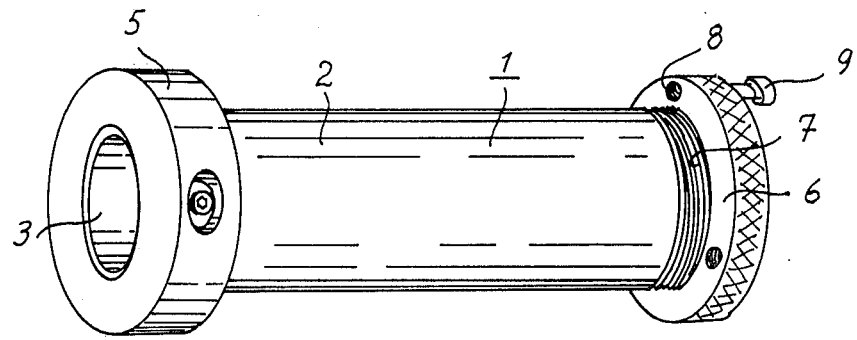
Figure 2:
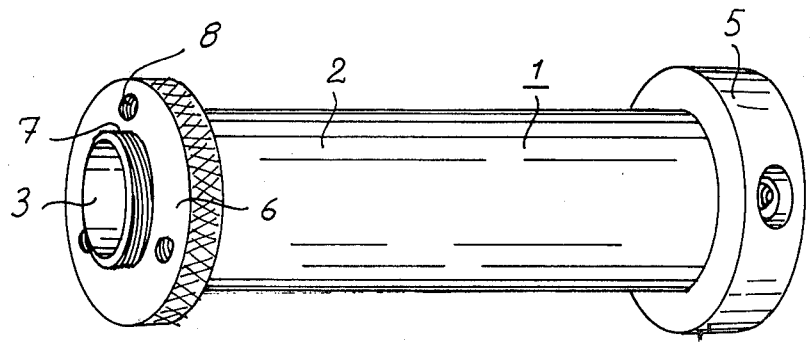

The clamp bushing according to the invention generally comprises a double walled sleeve 1 which is closed at both ends and which comprises an outer wall 2 and an inner wall 3 and a very narrow recess 4 therebetween which is adapted to be pressurized by the introduction of a pressure medium like oil, grease or similar under pressure. At one end the double walled sleeve has a fixed radially outwards directed collar 5 against which the tool, the workpiece or similar is intended to be clamped and locked. At the opposite end the sleeve is formed with means for axially clamping the tool, the workpiece or similar against the fixed collar. The said means may for instance be a nut 6 which can be screw connected to the sleeve over external threads 7 of the outer wall, and the nut is in the illustrated embodiment formed with three axially threaded bores 8 for the introduction of press screws 9 by means of which the tool, the work piece or similar can be clamped to the fixed collar before the clamp bushing is pressurized. In this case the nut 6 can be tightened relatively slightly and without the use of special tools, and the main axial pressure is provided by the press screws 9. There are three press screws which are evenly distributed over the periphery of the nut 6.

Figure 3:
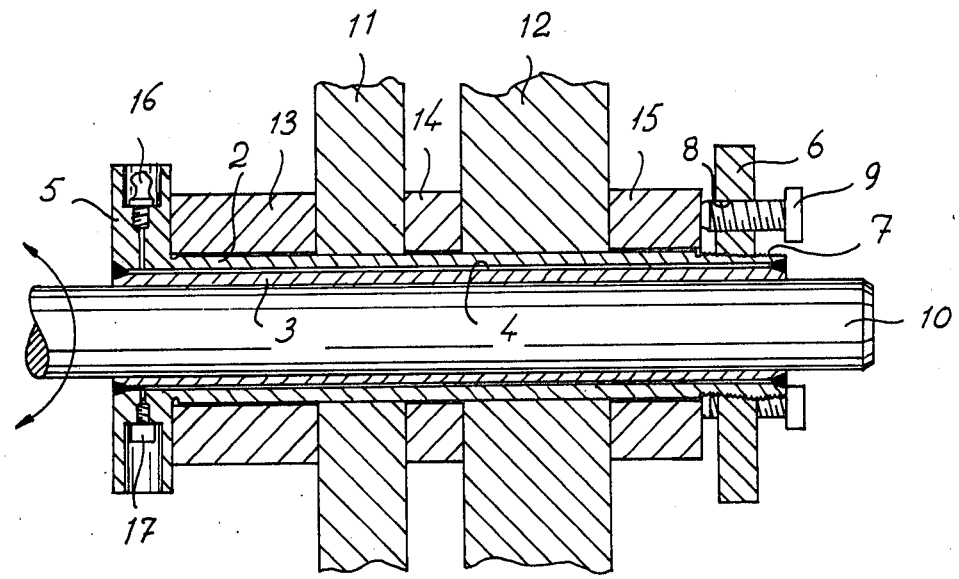
FIG. 3 is an axial cross section along a clamp bushing according to the invention which is mounted on a rotatable spindle and which in turn carries two rotating tools.

As evident from the FIG. 3 it is possible to set up or mount several tools on one and the same bushing for a common rotation on a rotatable spindle 10, and in FIG. 3 is illustrated how two different tools 11 and 12 like milling tools are mounted somewhat axially spaced from each other on the double walled sleeve. In order to provide an exact distance between the tools 11 and 12 and if suitable also between the collar 5 and the tools distance sleeves 13 and 14 are introduced between the collar 5 and the tools 11 and 12, and in order to get a suitable clamping distance for the nut 6 and the press screws 9 respectively a further distance sleeve 15 is mounted outside the tools.

The tools can be mounted easily releasable whereby the center bores of the tools are provided so that the tools can be moved axially onto the sleeve with slight slip fit, or the tools can be mounted more permanently whereby the central bores are provided for slight or tight press fit. The latter case is illustrated for instance in FIG. 5, the left part thereof.

The tools or the workpieces or similar are mounted as follows: In order to get, if necessary, the correct distance between the fixed collar 5 and the first tool 11 a distance sleeve 13 is chosen having a suitable axial length which is first mounted on the press sleeve. Thereafter the first tool 11, the distance sleeve 14, the second tool 12 and the outer distance sleeve 15 are mounted. The nut 6 is tightened to the outermost distance sleeve 15 by a relatively slight pressure so that the nut can easily be released, and the press screws 9 are tightened so that the tools 11 and 12 are steadily clamped to the fixed collar 5 and so that the press sleeve together with the tools and the distance sleeves forms an integral unit which can be easily handled.

In order to provide a pressurizing of the recess between the two walls 2 and 3 of the sleeve preferably the fixed collar 5 is formed with a nipple 16 or similar, by which a pressure medium like oil, grease or similar can be pressed into the recess 4. For releasing the pressure preferably the fixed collar 5 is also formed with a release bore having a drain screw 17 which releases the pressure from the sleeve recess 4 when being opened, whereby the sleeve regains its original form.

The sleeve together with the tools screws clamped thereon is pushed onto the rotatable spindle 10 which is preferably formed with slight slip fit in relation to the inner dimension of the sleeve, and thereafter the sleeve recess 4 is pressurized in that oil, grease or similar is pressed into the sleeve over the nipple 16. Thereby the sleeve extends both radially inwards and radially outwards, whereby the expandable outer wall 2 further secures the tools and the distance sleeves on the clamp bushing, whereas the expandable inner wall 3 secures the entire unit on the rotatable spindle 10. After the work is finished the clamp bushing together with the tools can easily be released in that the drain screw 17 is opened, whereby the walls 2, 3 of the sleeve regain their original form and the unit comprised of sleeve and tools can easily be pulled off the spindle 10. The sleeve together with the tools press clamped by the press screws 9 can be kept as a unit for a similar use later on, or the bushing together with the tools can be moved to another machine for a corresponding work operation, or the tools can be mounted on the spindle of a grinding machine or similar for grinding the tools or treating the tools in any other way.

Above is stated that the recess 4 of the sleeve has to be thin and that the sleeve is pressurized by being filled with oil, grease or similar material. Alternatively, however, the sleeve can be made somewhat wider and it may from the beginning be filled with a paste like material, and in such case it is normally sufficient that the press sleeve is pressurized by means of a piston or similar means which is pressed directly onto the paste like pressure medium. The pressure piston may be formed as one or more screws acting on the pressure medium directly or over a sealing piston.

Figure 4:
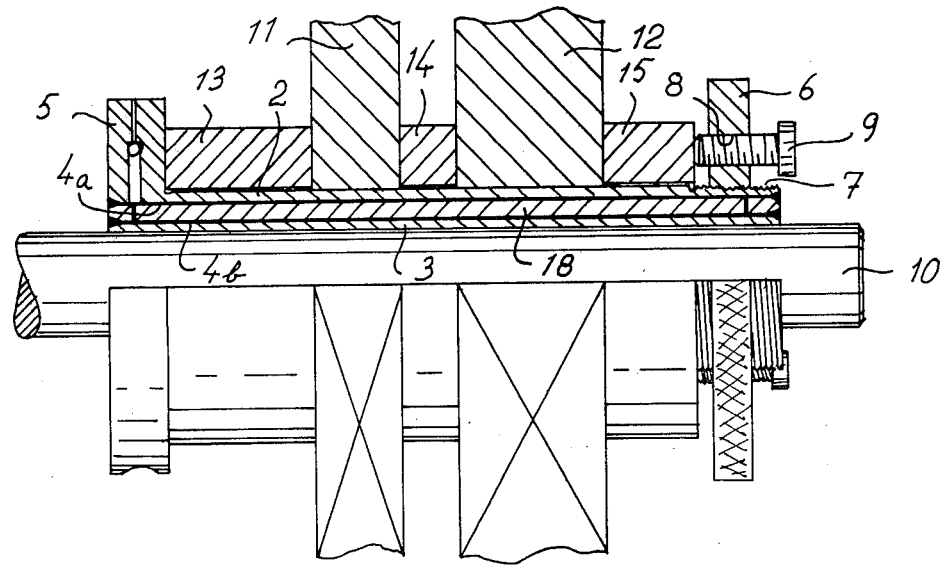
FIG. 4 illustrates in a corresponding way an alternative embodiment of the invention.

In order to make a substantial expansion possible of the outer walls and the inner walls it is important that the said walls are relatively thin and in order to make the clamp bushing sufficiently stable it can be designed as illustrated in FIG. 4. In this case a solid sleeve 18 is mounted centrally between the outer wall 2 and the inner wall 3 whereby a first recess 4a is provided between the outer wall 2 and the solid sleeve 18 and a second recess 4b is formed between the solid sleeve 18 and the inner wall 3. The two recesses 4a and 4b are interconnected and are pressurized and drained respectively by common means.

Figure 5:
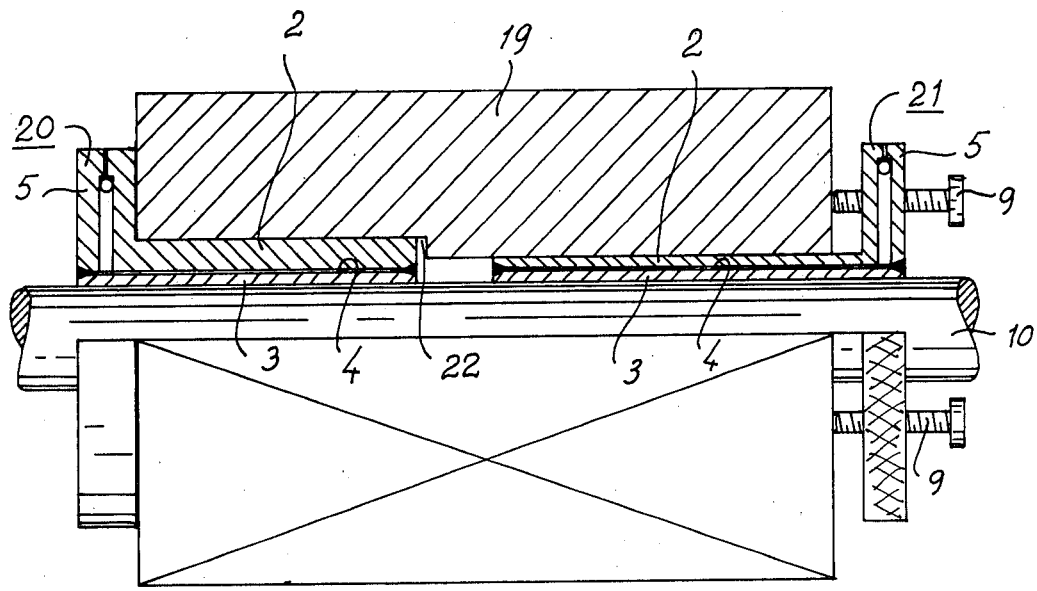
FIG. 5 shows a specific field of use for the invention.

In FIG. 5 is illustrated a special use of the invention in which an elongated tool or work piece 19 is mouned on the rotatable spindle 10 by means of two clamp bushings 20 and 21 respectively. The clamp bushing illustrated in the left hand part of the drawing is formed with tight press fit in relation to the corresponding central bore 22 of the tool whereas the righ hand clamp bushing 21 is mounted easily releasable by a slip fit. The left hand bushing is for the purpose formed with a relatively thick outer wall 2 and a thin inner wall 3. The bushing 20 is pressed into the central bore 22 of the tool and is kept firmly connected thereto by the press fit. When pressurizing the left hand clamp bushing substantially all expansion follows at the inner wall 3 for securing the clamp bushing 20 to the rotatable spindle 10. On the contrary the right hand clamp bushing 21 can be mounted substantially as previously described in that the clamp bushing 21 is moved into the center bore of the tool, the tool 19 together with the two clamp bushings 20 and 21 is mounted on the spindle 10, the two clamp bushings are pressurized, and not until the bushings are pressurized the pressure screws 9 are tightened for further axial securing of the bushing in relation to each other and in relation to the spindle 10.

It is to be understood that the above specification and the embodiments of the invention illustrated in the drawings are only illustrative examples and that all kinds of modifications may be presented within the scope of the appended claims. For instance the clamp bushing can be made in any suitable lengths, and in an actual embodiment of the invention a bushing is manufactured at standard lengths of 115, 165, 215, 265, 315 and 365 mm, all having an outer diameter of 60 mm. The inner diameter has been varied between 30 and 50 mm, whereby the bushing is formed with one recess for a bushing having an inner diameter of 50 mm and with two recesses and an inner solid sleeve for a bushing having an inner diameter of less than 50 mm. It is further obvious that the bushing can be pressurized and released from pressure by one single external or integral means like a piston, a sealed screw or similar which acts directly on the pressure medium.

What is claimed is:

1. Apparatus for setting up tools, workpieces or similar mountable members on a rotatable spindle, comprising a double walled sleeve, said double walled sleeve having at one end a fixed collar, said sleeve having at the opposite end means for axially clamping and securing a tool or similar member on the sleeve in engagement with the fixed collar, said double walled sleeve enclosing a solid sleeve defining on each side thereof a recess with a relatively thin outer wall and a relatively thin inner wall, respectively, the two recesses being interconnected so as to permit common pressurization and release of pressure.

2. A method of setting up tools, workpieces or similar mountable members on a rotatable spindle by means of a clamp bushing, the bushing comprising a double walled sleeve which is closed at both ends and which has at one end a fixed radially outwardly directed collar and at the opposite end means for axially securing the mountable member or members on the clamp bushing, the bushing being formed with means for permitting pressurization of a recess formed between the outer wall and the inner wall of the sleeve and for releasing pressure from said recess, comprising slipping onto the sleeve at least one tool or similar mountable member formed with a suitable fit in relation to the outer dimension of the sleeve, applying a first axial locking means mounted at the outer end of the sleeve to thereby slightly clamp the mountable member between the collar of the bushing and the first locking means, turning a second axial locking means comprising at least one axial screw means threadedly engaging said first locking means so as to strongly clamp said mountable member against the fixed collar on said double walled sleeve, mounting the sleeve together with the clamped mountable member onto a rotatable spindle, pressurizing the interior of the recess of the sleeve whereby the two walls of the sleeve are subjected to radially inwardly and outwardly directed pressure so as to provide outward and inward expension of the said walls, whereby the sleeve, the rotatable spindle and the tool, workpiece or similar mountable member are interconnected as a coherent rotatable unit.

3. A method as claimed in claim 2, wherein several tools, workpieces or similar mountable members are mounted axially successively on the clamp bushing and exactly positioned axially by means of distance sleeves.

4. Apparatus for setting up tools, workpieces or similar mountable members on a rotatable spindle, comprising a sleeve having an outer wall and an inner wall and being closed at both ends to thereby define a recess between said walls which can be pressurized so as to expand at least one of said walls, said sleeve having at one end a fixed collar and at the opposite end a first locking means for slight axial clamping and securing of a mountable member or members on the sleeve in engagement with the fixed collar, and a second locking means carried by the first locking means for axially strong clamping of the mountable member or members to the said fixed collar.

5. Apparatus as claimed in claim 4 wherein said first locking means for axially slight securing of the mountable member comprises threads at the outer end of the double walled sleeve, and a nut engaging said threads for pressing the mountable member or members against the fixed collar.

6. Apparatus as claimed in claim 5 wherein said second locking means comprises one or more axial press screws threadedly engaging said first locking means for firmly clamping said mountable member or members against the fixed collar after said nut has been initially tightened.

7. A method of setting up a tool, workpiece or similar mountable member on a rotatable spindle by means of clamp bushings each comprising a double walled sleeve closed at both ends so as to form therein a pressurizable recess, a first one of the bushings having at one end a fixed radially outwardly directed collar, and a second one of the bushings having at its opposite end means for axially securing the mountable member between the clamp bushings, the method comprising mounting the mountable member with a press fit on said first clamp bushing, mounting the mountable member at its other end on the second clamp bushing with a slip fit, slipping the mountable member together with the two clamp bushings onto a rotatable spindle, pressurizing the recesses of the clamp bushings, and firmly securing the mountable member by turning threaded screws carried by a collar of the second bushing and constituting said axially securing means.

8. A method as claimed in claim 7 wherein the recess in said first clamp bushing formed by the double walled sleeve is defined by a relatively thick outer wall and a relatively thin inner wall, and wherein the mountable member is mounted with a press fit on the sleeve of the first clamp bushing, and the sleeve of the first clamp bushing together with the mountable member thereon is mounted on the rotatable spindle with slip fit, and wherein the pressurization of the recess provides an expansion inwardly of the inner wall substantially greater than the outward expanion of the outer wall.

9. Apparatus for use in carrying out the method of claim 7, comprising a first clamp bushing in the form of a double walled sleeve which is closed at both ends and which has at one end a fixed radially outwardly directed collar, and a second clamp bushing in the form of a double walled sleeve which is closed at both ends and which has at one end means for axially securing a mountable member between the first and second clamp bushings, each bushing being formed with means for pressurizing a recess formed between its outer and inner walls, said first clamp bushing being adapted to be mounted with press fit in a bore of an elongated mountable member from one end thereof, said second clamp bushing being adapted to be mounted with slip fit from the opposite end of the mountable member, and said axial securing means comprises a radial collar on said second clamp bushing provided with axial press screws adapted to be tightened axially directly or indirectly against the mountable member.

10. Apparatus as claimed in claim 9 wherein the recess of said first clamp bushing is defined by a relatively thick outer wall and a relatively thin inner wall so as to provide substantial differential expansion of the inner and outer walls.

* * * * *